United States Patent [19]

Gonzalez

[11] Patent Number: 5,029,936
[45] Date of Patent: Jul. 9, 1991

[54] CUSTOM HARD TOP, AND METHODS OF CONSTRUCTING AND UTILIZING SAME

[76] Inventor: Jorge T. Gonzalez, 820 Poplarwood La., Kissimee, Fla. 32743

[21] Appl. No.: 413,195

[22] Filed: Sep. 27, 1989

[51] Int. Cl.⁵ .................................... B62D 25/06
[52] U.S. Cl. ................................ 296/210; 296/211; 296/901; 248/903; 403/338; 411/104; D12/156
[58] Field of Search ............... D12/89, 156; 296/99.1, 296/210, 211, 901; 248/903; 411/84, 85, 104; 403/338, 337, 335

[56] References Cited

U.S. PATENT DOCUMENTS

| | | | |
|---|---|---|---|
| D. 210,362 | 3/1968 | Derenski | D12/156 |
| D. 212,214 | 9/1968 | Zoltok | D12/89 X |
| D. 250,525 | 12/1978 | Snyder | D12/156 |
| D. 251,292 | 3/1979 | Johnson et al. | D12/156 |
| D. 271,864 | 12/1983 | Kangas | D12/156 X |
| D. 283,704 | 5/1986 | Higgins | D12/156 |
| D. 285,059 | 8/1986 | Nardi | D12/156 |
| D. 286,394 | 10/1986 | Johnson et al. | D12/156 |
| D. 294,934 | 3/1988 | Thomas | D12/156 |
| D. 297,225 | 8/1988 | Johnson et al. | D12/156 |
| D. 298,927 | 12/1988 | Johnson et al. | D12/156 |
| D. 298,928 | 12/1988 | Johnson et al. | D12/156 |
| 3,728,537 | 4/1973 | Barényi et al. | 296/210 X |
| 4,098,534 | 7/1978 | Wood | 296/180.4 |
| 4,206,715 | 6/1980 | Greene et al. | 29/416 |
| 4,257,643 | 3/1981 | Choulet | 296/180.2 |
| 4,837,914 | 6/1989 | Borum et al. | 296/901 X |

*Primary Examiner*—Dennis H. Pedder
*Assistant Examiner*—Andrew C. Pike
*Attorney, Agent, or Firm*—Irving M. Weiner; Robert M. Petrik; Joseph P. Carrier

[57] ABSTRACT

An improved conversion custom hard top or roof for vehicles is aerodynamic and provides greater headroom or interior vertical space for the occupants of the vehicle. The replacement roof comprises three separate levels distinguished by the three riser portions. Two of the riser portions are convex and the third riser portion is concave.

5 Claims, 2 Drawing Sheets

CUSTOM HARD TOP, AND METHODS OF CONSTRUCTING AND UTILIZING SAME

BACKGROUND OF THE INVENTION

1. Field of the Invention

The present invention relates to a van top height extension device. More particularly, the invention relates to a replacement for a conventional or factory van roof which will enlarge the interior vertical space or the headroom of the van and enhance or retain the integrity of the aerodynamics of the van.

Prior to the present invention, van roof extensions included placing square members upon the vehicle. This created greater air friction which resulted in lower gas mileage and greater wind noise.

2. Description of the Relevant Art

Heretofore, there have been various means for providing aerodynamic vehicle roofs.

U.S. Pat. No. 4,257,643 issued in 1981 discloses an air deflector for the roof of a truck cab.

U.S. Pat. No. 4,098,534 issued in 1978 discloses an air deflector for the front portion of a truck trailer.

U.S. Pat. No. 4,206,715 issued in 1980 discloses a vehicle end cap designed to make a trailer more aerodynamic.

U.S. Des. Pat. No. D251,292 issued in 1979 discloses a top for a van including tiered portions. This design differs from the present invention in that only two tiers are provided and they do not consistently rise from front to back and the sides are beveled, not rounded.

U.S. Des. Pat. No. D297,225 issued in 1988 discloses a two-tier van top with a rear spoiler. This design differs from the present invention in that windows are shown and the spoiler would not allow the van top to be as aerodynamic as the present invention.

U.S. Des. Pat. No. D294,934 issued in 1988 discloses a replacement van top. This design differs from the present invention in that it is not rounded aerodynamically and does not include curved sides.

U.S. Des. Pat. No. D286,394 issued in 1986 discloses a van top having two tiers and beveled sides. This design differs from the present invention in that there are only two tiers and does not include rounded sides.

The present invention provides a replacement vehicle top which is aerodynamic, easily attached and provides greater headroom in the vehicle.

SUMMARY OF THE INVENTION

The present invention provides an aerodynamic extension to a vehicle roof. The extension comprises a three-level, ovate roof with rounded sides. Preferably, the extension will be mounted onto the vehicle from the inside by bolts.

In a preferred embodiment, a first rise is provided near the front of the extension. The first rise is convex in shape and located approximately ⅓ of the length from the front of the extension. The position of the first rise allows more headroom behind the front seats of the van. The second rise is concave in shape and located approximately ⅔ of the length from the front of the extension. The position of the second rise allows more headroom in the rear ⅓ of the van.

It is an object of the present invention to provide a replacement roof which retains the aerodynamics of a vehicle, reduces wind noise, and does not lower gas mileage.

It is a further object of the present invention to provide a replacement roof which will provide greater headroom in the vehicle.

It is still a further object of the present invention to provide a replacement roof which is easily attachable from the inside of the vehicle.

The above and further objects, details, and advantages of the invention will become apparent from the following detailed description, when read in conjunction with the accompanying drawings.

DETAILED DESCRIPTION OF THE PREFERRED EMBODIMENT

Figure 1:
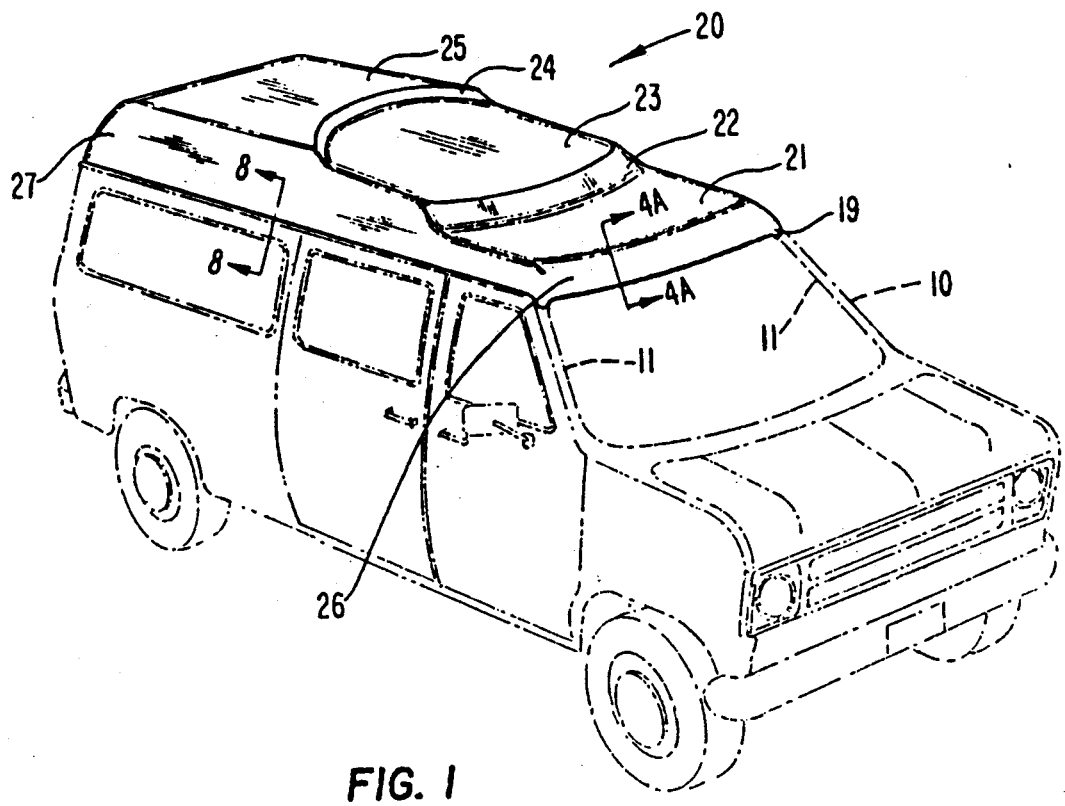
FIG. 1 illustrates a perspective view of a custom hard top replacement in accordance with the present invention.

As shown in FIG. 1, a custom hard top replacement roof 20 is shown attached to a passenger vehicle 10. The roof 20 is a three-level device 21, 23, 25 with rounded sides 27, 28 for aerodynamic purposes. The step levels 21, 23, 25 are separated by bevels or risers 22, 24. Bevel 22 separates levels 21 and 23 and is bowed outwardly or is convex. Bevel 24 separates levels 23 and 25 and is bowed inwardly or is concave.

Figure 2:
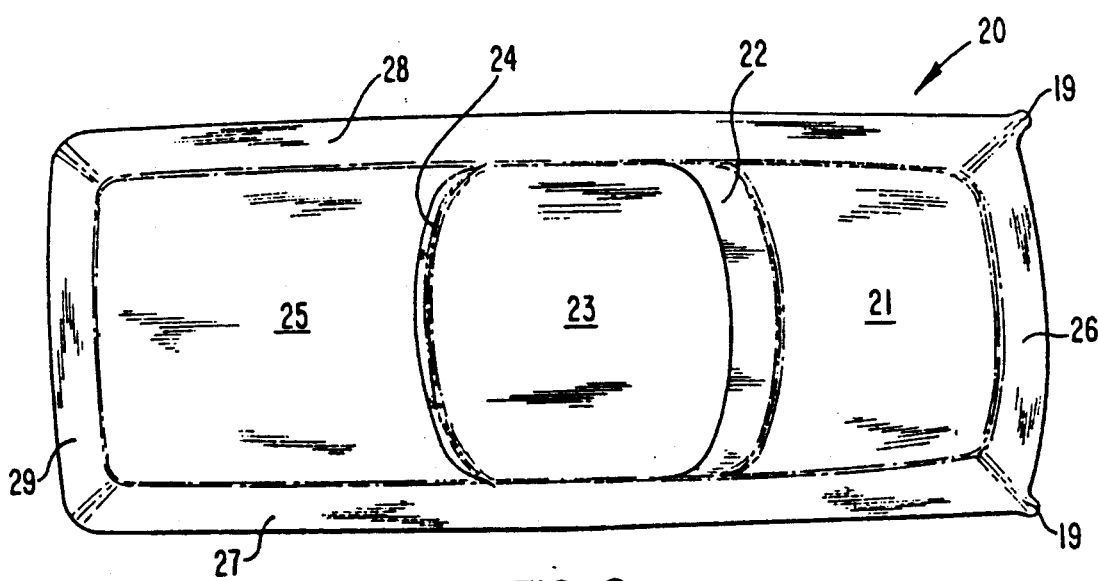
FIG. 2 illustrates a top plan view of a custom hard top replacement in accordance with the present invention.
Figure 3:
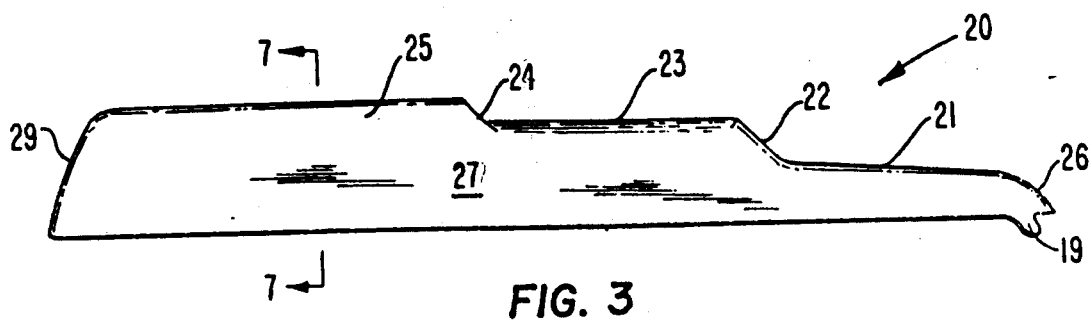
FIG. 3 illustrates a right side view of a custom hard top replacement in accordance with the present invention.

As best seen in FIGS. 2 and 3, the first level 21 has at its front merging incline 26 which provides a smooth transition between the windshield and the replacement roof 20. At either side of incline 26 is protusion 19 which merges with windshield risers 11. Again, protrusions 19 provide a smooth transition between the vehicle 10 and the replacement roof 20. Incline 26 and protrusions 19 allow for the smooth flow of air over the replacement roof 20.

At the rear of roof 20, end wall 29 slopes downwardly from level 25. As best seen in FIG. 3, end wall 29 will permit smooth air flow behind the vehicle.

As best seen in FIG. 3, each successive level 21, 23, 25 provides greater headroom towards the rear of the vehicle.

Figure 4:
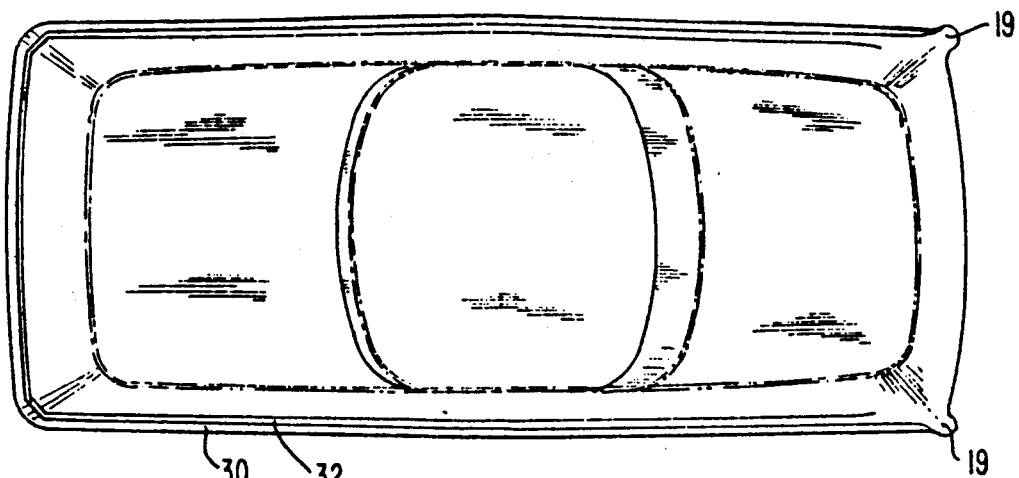
FIG. 4 illustrates a bottom plan view of a custom hard top replacement in accordance with the present invention.
Figure 4A:
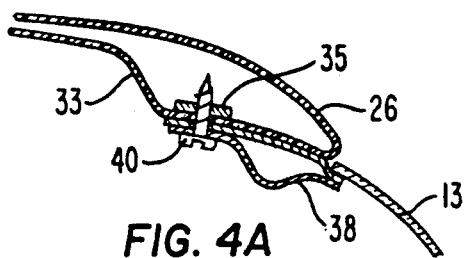
FIG. 4A illustrates a cross-section taken along line 4A—4A in FIG. 1.
Figure 5:
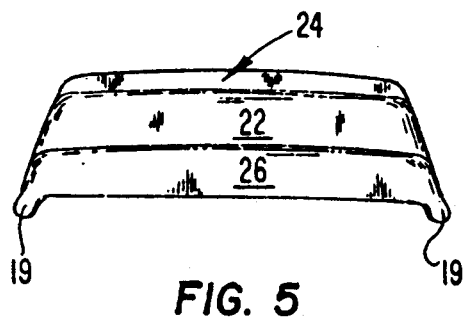
FIG. 5 illustrates a front elevational view of a custom hard top replacement in accordance with the present invention.
Figure 6:
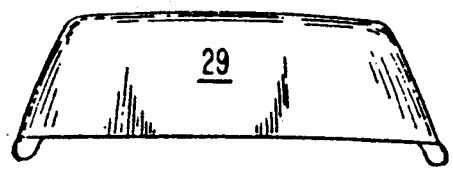
FIG. 6 illustrates a rear elevational view of a custom hard top replacement in accordance with the present invention.
Figure 7:
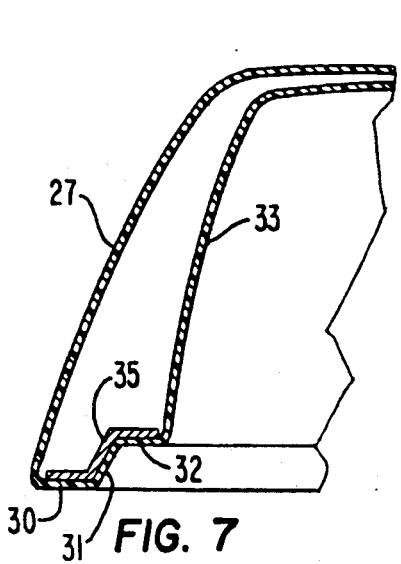
FIG. 7 illustrates a cross-section taken along line 7—7 in FIG. 3.
Figure 8:
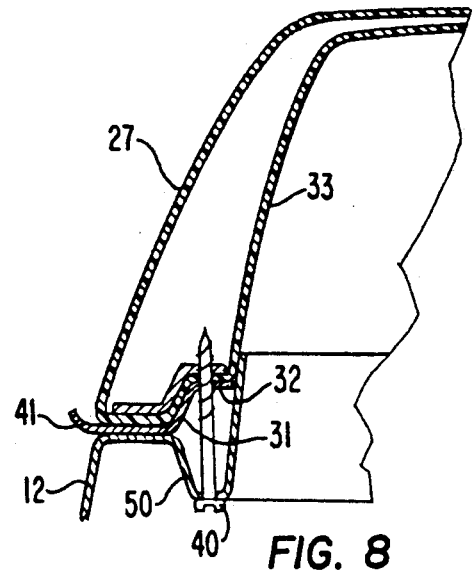
FIG. 8 illustrates a cross-section taken along line 8—8 in FIG. 1.

Preferably, but not necessarily, roof 20 is constructed of fiberglass and includes a double-wall type structure. As best seen in FIGS. 4A and FIG. 8, this double-wall construction permits connection from the interior of the vehicle without the possibility of leakage and adds sufficient strength to the replacement roof 20.

As best seen in FIG. 4A, incline 26 merges into windshield portion 13 of the vehicle. Inner wall 33 is fastened adjacent windshield portion 13. Preferably, but not necessarily, fasteners 40 are provided to secure the replacement roof 20. Inner wall 33 includes means 35 to accommodate the fasteners 40. Fasteners 40 are preferably attached to the securement means 35 which acts as a securement member. Securement means 35 extends the entire circumference of replacement roof 20. A seal 38 may be fastened inside the vehicle by member 40. The seal 38 may be a decorative member normally provided by the manufacturer.

As best seen in FIG. 8, side wall 27 are fastened to the vehicle by fasteners 40. Sidewalls 28 and end wall 29 would be fastened to the vehicle in a manner similar to that shown in FIG. 8. However, securement means 35 is shaped to follow the inner wall portion 30, 31, 32 which may resemble a reversed Z at various locations of the roof. Base 30 is provided to set atop a small portion of the orginal roof of the vehicle or atop a rain gutter 41, whichever is desired. Riser 31 and securement means 35 are provided to add rigidity to the attachment area. Securement means 35 rests atop each of portions 30, 31, 32, to spread the clamping force of bolt or fastener 40 over a larger surface area and thus provide a more secure roof attachment.

A rain gutter 41 provided from the vehicle may remain between base 30 and vehicle 12. Also, a seal 50 may be provided inside the vehicle 12 and is secured by fastener 40. Seal 50 may be a decorative member normally provided by the manufacture to add to the interior decor of the vehicle.

Although there has been described what is at present considered to be a preferred embodiment to the invention, it will be understood that various modifications and variations may be made therein, and it is intended to cover in the appended claims all such modifications as fall within the true spirit and scope of the invention.

I claim:

1. A hard top roof for a vehicle having a windshield and sidewalls, said roof comprising:
   an ovate member having a first level, a second level, and a third level, said levels being defined by a first bevel portion, a second bevel portion, and a third bevel portion;
   double-wall construction for providing strength and noise insulation; and
   rounded side portions including a reverse Z configuration at a base thereof for securing said roof to said vehicle; wherein;
   said first bevel portion is adjacent said windshield;
   said second bevel portion is located at a rear of said first level and at a front of said second level, wherein said second bevel portion is convex is shape; and
   said third bevel portion is located at a rear of said second level and at a front of said third level, wherein said third bevel portion is concave in shape.

2. A conversion roof for a vehicle having a windshield and sidewalls, said conversion roof comprising an aerodynamic extension, said extension comprising:
   a three-level ovate member including a first section, a second section, and a third section; and
   means for securing said conversion roof to said vehicle; wherein:
   said second section is higher than said first section and provides a larger vehicle interior vertical space than said first section;
   said third section is higher than said second section and provides a larger vehicle interior vertical space than said second section;
   said first section and said second section are joined by a horizontally convex bevel; and said second section and said third section are joined by a horizontally concave bevel.

3. The conversion roof of claim 2, wherein:
   said member is of double-wall construction for strength and noise insulation.

4. The conversion roof of claim 3, wherein:
   said means for securing said conversion roof is secured from an interior of the vehicle along an edge of a remainder of a roof of the vehicle.

5. The conversion roof of claim 2, wherein:
   said first section smoothly merges with said windshield by providing a rounded bevel adjacent thereto.

* * * * *